Patented June 15, 1954

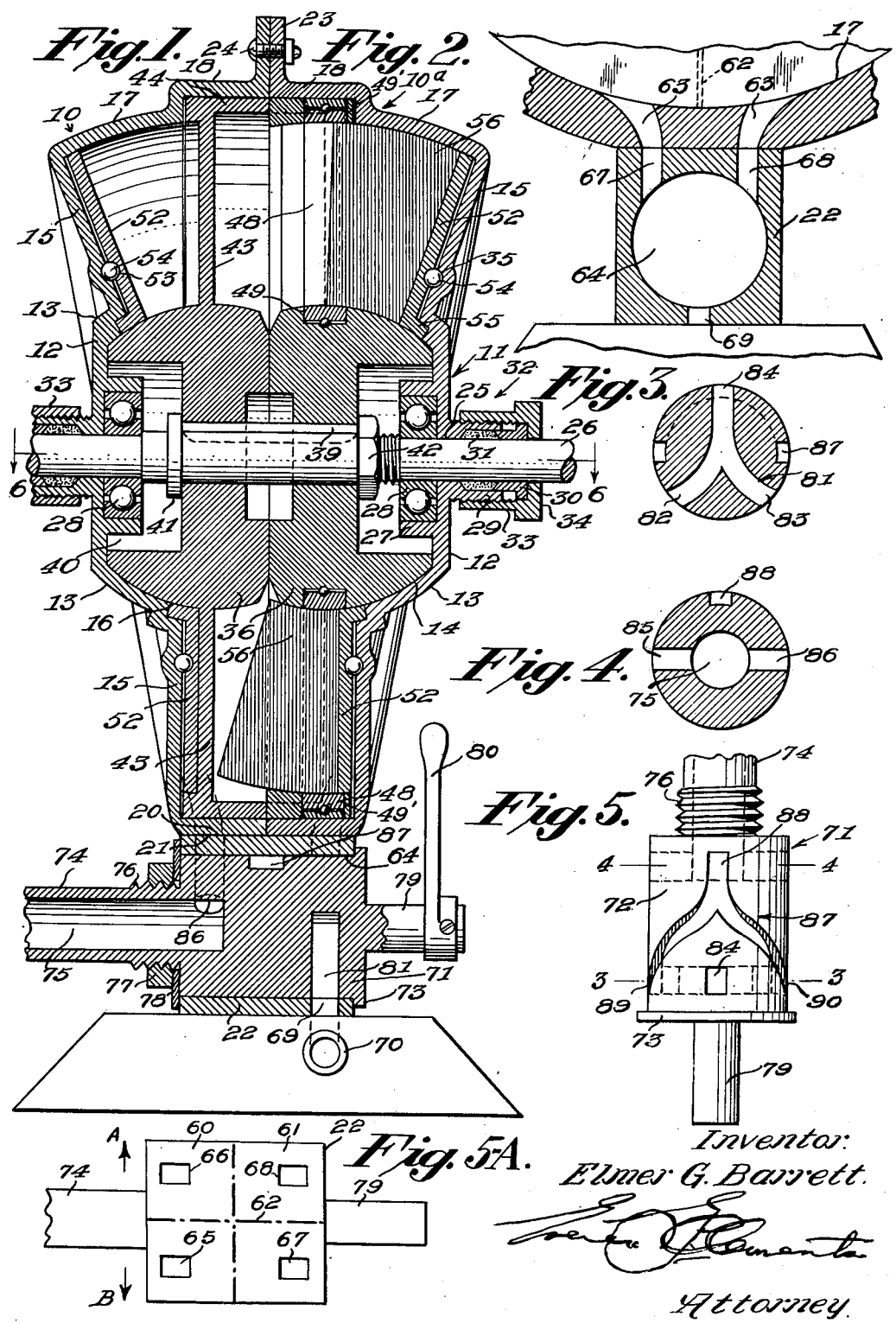

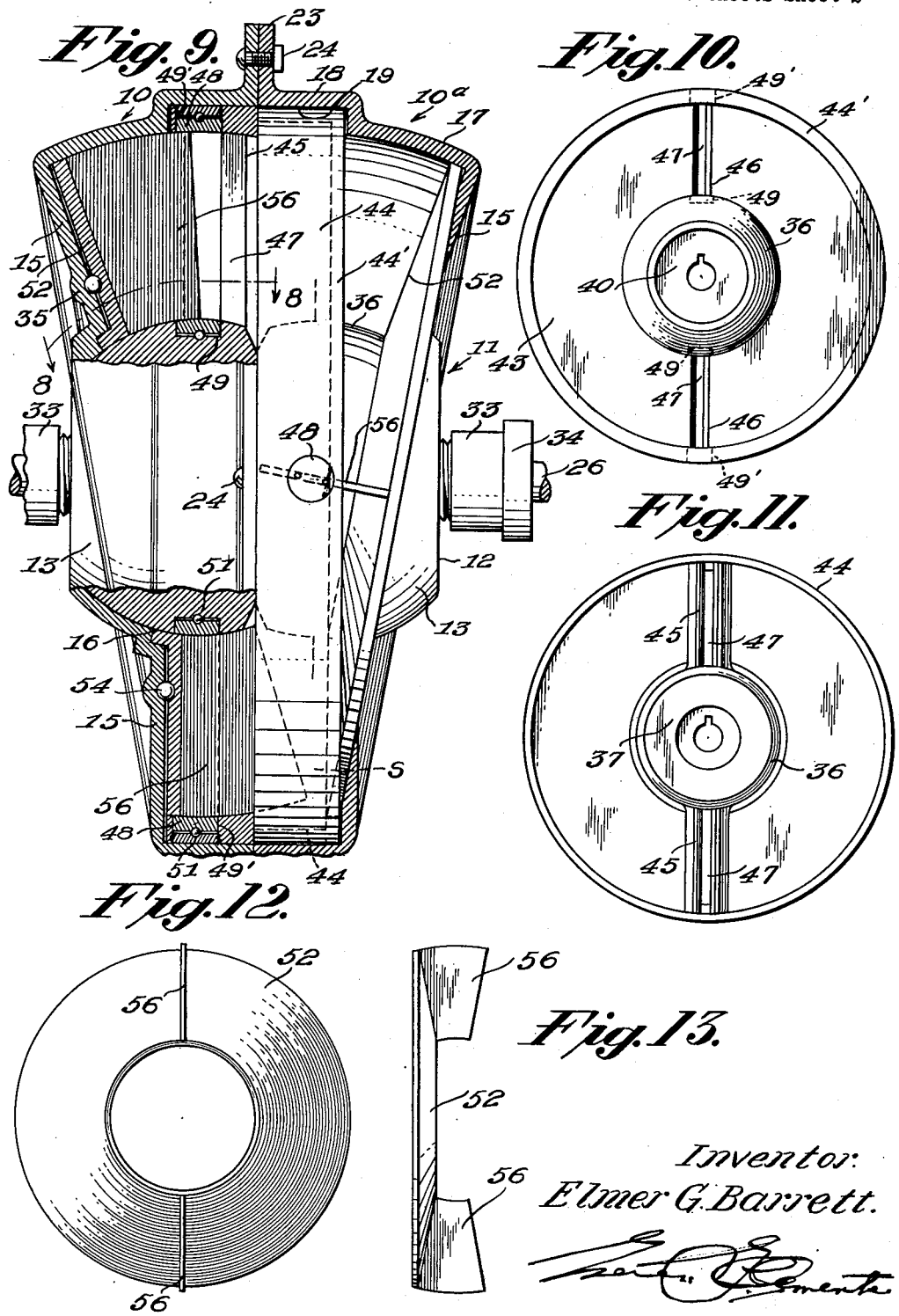

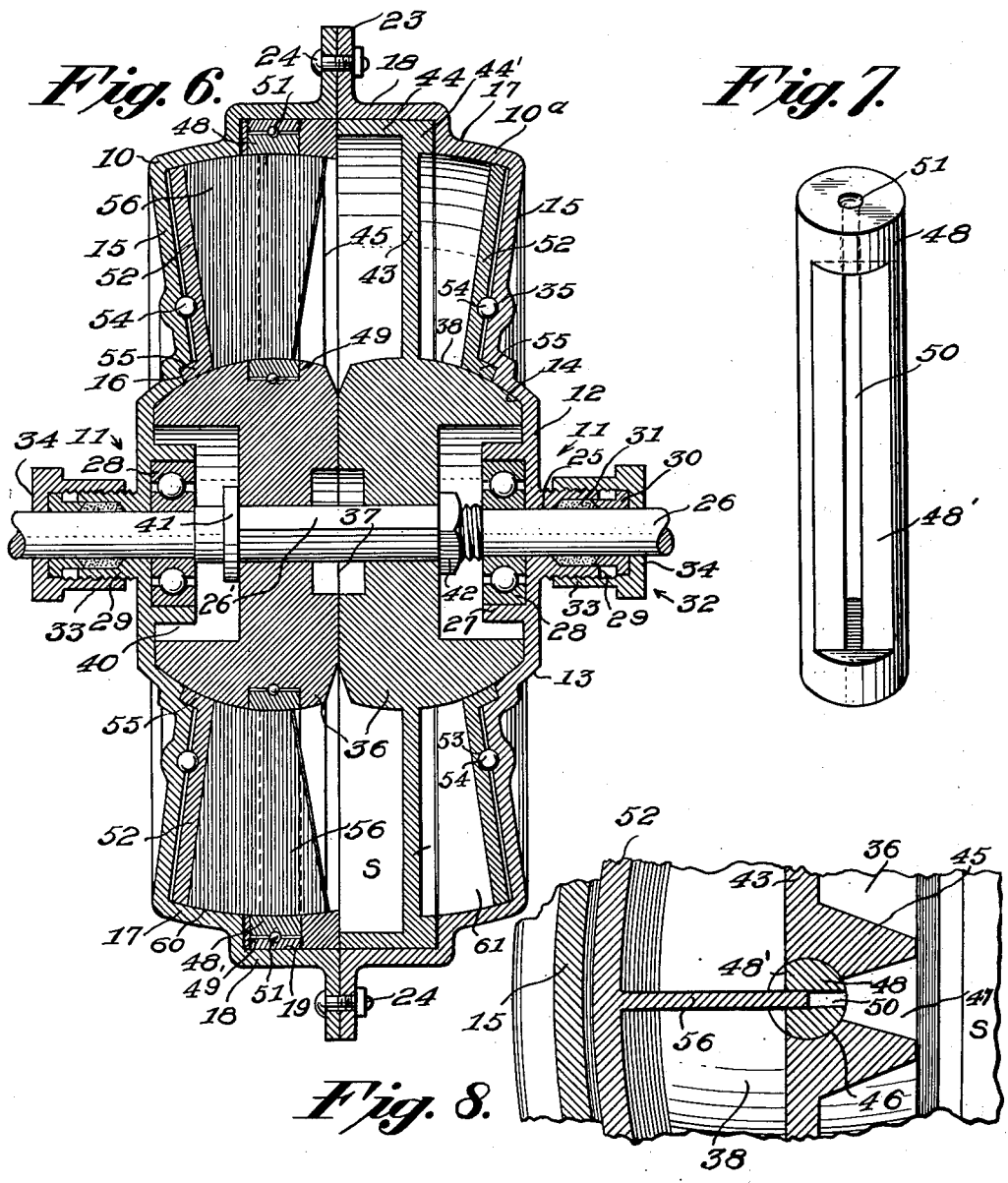

2,681,046

UNITED STATES PATENT OFFICE 2,681,046

ROTARY MOTOR

Elmer G. Barrett, Pampa, Tex.

Application March 20, 1951, Serial No. 216,583

7 Claims. (Cl. 121—67)

This invention relates to a rotary motor or other fluid displacement devices such as pumps, compressors or the like.

In the instant embodiment of my invention a rotary motor is shown having a two part piston-vane connected rotor providing therein an expansion chamber during each revolution of the rotor. The engine also includes as an essential part thereof, a casing, certain walls of which, cooperate with the vane connected piston parts to cause relative movement therebetween under the expansion action of an operating fluid admitted to the casing and rotor.

While prior proposed constructions of this character generally satisfied the requirements of a motor of this type they were either too bulky and costly in construction and maintenance or they were inefficient in the utilization of fluid pressure energy and the conversion of same for the required mechanical movements.

It is accordingly an object of this invention to provide a rotary motor of maximum efficiency and one which is simple and compact in construction and which is capable of manufacture and operation at relatively low cost.

It is a further object of the invention to provide a rotary motor having increased operating efficiency, through reduction in friction losses, minimum of operating parts, and wherein the expansion of the operating fluid is more efficiently utilized.

A still further and more specific object of the invention is to provide a rotary motor including a casing having oppositely inclined frusto-conical side walls and a rotor rotatably supported therein and wherein the rotor includes a central disk-like member centrally mounted in the casing and spaced from the side walls thereof for rotation in a fixed vertical plane and a pair of relatively movable piston-vane carrying rings which are rotatable therewith at the opposite sides thereof and having thrust bearing on the respective inclined casing walls, which thrust bearings hold the bevel disk convex side in sealing contact with its adjacent rotor wall contour.

A further object is to provide such a rotary motor, in which the central rotor disk member is formed for lateral guiding movement of the vane type pistons and the piston carrying rings and cooperating casing walls provide a pair of operating chambers, in which organization the side walls of the casing also serve as thrust bearings for the piston carrying rings. In this organization the operating chambers at the bottom portion of the casing are of a width equal to the thickness of the rings and gradually increase to maximum width at the top portion of the casing. This casing of the motor is provided with a valve controlled fluid inlet and exhaust ports in the peripheral casing wall at the bottom thereof for admission of the operating fluid to and exhaustion thereof from the chambers adjacent areas of least volume thereof in usual manner.

Other objects and advantages of the invention will become apparent in the course of the following detailed description, taken in connection with the accompanying drawings wherein:

Fig. 1 is a transverse vertical sectional view of the rotary motor in accordance with a preferred structural embodiment thereof;

Fig. 2 is a fragmental vertical sectional view of the motor base and lower part of the casing and showing steam ports extending from a valve opening in the base to the interior of the casing;

Fig. 3 is a transverse sectional view of a combined valve and steam exhaust member and is taken in the plane of line 3—3 on Fig. 5;

Fig. 4 is a view similar to Fig. 3 but taken in the plane of line 4—4 on Fig. 5;

Fig. 5 is a plan view of the combined valve and steam exhaust member;

Fig. 5A is a diagrammatic plan view for clarification of description of the valve controlled ports in the engine base;

Fig. 6 is a horizontal sectional view of the motor as observed in the plane of line 6—6 on Fig. 1;

Fig. 7 is a perspective view of a slotted piston guide member, of which several thereof are embodied in the motor construction as a flat sided trunnion;

Fig. 8 is an enlarged sectional view as observed on line 8—8 of Fig. 9;

Fig. 9 is a fragmental view corresponding to Fig. 1 partly in section and partly in elevation and with the rotor advanced 90° from the position thereof in Fig. 1;

Fig. 10 is a side elevational view of a piston guide disk embodied in the motor rotor;

Fig. 11 is a side elevational view of the piston guide disk as observed from the opposite side of the disk shown in Fig. 10;

Fig. 12 is a side elevational view of a piston carrying ring; and

Fig. 13 is an edge view of the piston carrying ring showing the shape of the integral piston vanes.

Referring now in detail to the drawings, the improved motor comprises a casing including opposed cooperating sections 10 and 10a. The casing sections are of like construction and each comprises a hub section 11 including a vertical wall 12, and an annular wall 13 extending inwardly from the perimeter of the vertical wall and having an inner spherical surface 14.

The wall 13 is of a variable extent, being of substantial length at the bottom thereof and gradually diminishing in length to the top thereof as is clearly shown in Figs. 1 and 9.

An annular side wall 15 extends outwardly from the inner terminal of wall 13 and the annular wall 15 is of frusto-conical form having its axis inclined upwardly in a transverse vertical plane of the casing.

An annular seat 16 is provided at the juncture of walls 13 and 15 for a purpose later referred to.

The annular side walls 15 of the casing sections merge into peripheral walls 17 having inner spherical surfaces and which are of substantial length at the top of the casing and gradually decrease in length toward the bottom of the casing. The casing sections further include adjacent annular walls 18 which are displaced outwardly of walls 17 in the provision of a relatively wide piston guide member seat 19.

The casing sections at the bottom thereof present a plane surface as indicated at 20 see Fig. 1, and such surface engages the top surface 21 of a base 22, to which the casing sections are suitably secured as by bolts, not shown.

The casing sections 10, 10a at the inner termini of walls 18 are provided with outwardly directed flanges 23 which are removably held in engagement with each other by bolts 24.

The walls 12 of the hub portions 11 are provided with bores 25 for rotatably receiving spaced portions of a driven shaft 26 and the walls 12 are further provided with inwardly directed annular flanges 27 surrounding the bores 25 and within which and about the shaft 26 are disposed antifriction bearing assemblies 28.

The walls 12 are each provided on their outer face surrounding the bore 25 with a cylindrical flange 29, whose inner wall is spaced from shaft 26 to provide a packing gland whose outer wall is threaded. A cylindrical packing compressing member 30 is slidably supported on shaft 26 and is movable within the space between flange 29 and shaft 26 to compress a packing material 31 therein when a nut 32, having an internally threaded annular flange 33 is threaded on flange 29. As such time the shaft receiving wall 34 of the nut engages with the end of the packing compressing member 30. The frusto-conical side walls 15 of the two casing sections are each provided with annular ball bearing races 35.

Disposed within the casing is a fluid pressure operated rotor which comprises a member 36 for guiding piston supporting rings as well as the pistons themselves and which also divide the casing into a pair of laterally spaced annular expansion chambers for the working fluid.

The said member 36 comprises a pair of juxtaposed relatively large hubs having abutting inner plane end walls 37, disposed within the plane of engagement of casing section flanges 23, and outer hub portions having spherical wall surfaces 38 which are concentric with the inner surfaces of the peripheral casing walls 17.

The hubs 36 are centrally bored for reception of a slightly enlarged center section 26', of the driven shaft 26 and to which the hubs are rigidly connected for uniform rotation by means of a key 39.

As shown in Figs. 1 and 6, the hubs 36 are recessed at their outer ends, as at 40, for reception of the antifriction supporting bearing assemblies 28, and the center shaft section 26' is provided with a rigid collar 41 engaging with the bottom of the recess in one hub member 36. A nut 42 is shown threaded on shaft section 26 and engaging the bottom of the recess in the other hub. These hubs are thus secured together against axial separation on the center shaft section 26' and by provision of the shaft key 39, the hubs are at all times rotatable with the shaft in unison.

Radiating from an intermediate portion of each hub 36 is a disk-like wall or web 43 which merges into an inwardly directed peripheral flange 44. The inner opposed ends of the two flanges 44 thus abut in the plane of the juncture of the casing flanges 23 and the abutting faces of hubs 36. This annular flange 44 also extends outwardly of each wall 43 in the provision of a thickened rim 44' to provide a bearing space for trunnions later to be described.

Each wall or web 43 is further provided with a pair of diametrically opposed ribs 45 which extend radially between the opposed faces of the annular flanges 44 and the inner hub portion 36 and the wall together with each said rib is provided with a radially extending recess or bore 46 whose wall in cross section is in the form of a major arc of a circle and a chord which latter conforms to the outer face of the wall 43. The diametrically disposed ribs 45 and recesses 46 on the wall 43 of one member are disposed in 90° relation to those on the opposing wall 43 and the inner face of each rib 45 is provided with a radial slot 47 which communicates with the radial bores 46 for a purpose later to appear.

A piston guide and bearing element in the form of a trunnion 48 is rotatably disposed in each bore 46 and such element is of elongated form and has a cross sectional configuration conforming to the wall of the bore or recess 46, which extends from the inner hub 36 to the peripheral wall flanges 44—44'. The opposite end portions of the piston vane guiding and sealing member 48 are circular in cross-section as is clearly shown in Fig. 7, and these cylindrical end portions are journalled in the cylindrical sockets 49 and 49' in the hub and in the peripheral flange 44', respectively as shown in Fig. 10.

Each guide member 48 is provided with a relatively narrow slot 50 which extends transversely therethrough for the full distance between the adjacent flange 44—44' and the hub 36, for a purpose later to appear. An antifriction thrust bearing 51 is preferably disposed between the ends of the trunnion member 48 and the bases of the sockets 49—49'. A vane type piston carrying member, in the form of a frusto-conical ring 52, is mounted on a spherical hub surface 38 and disposed between each frusto-conical casing section wall 15 and the adjacent piston guide supporting wall or web 43.

The outer concaved wall surface of each of the piston carrying rings 52 conforms to the inner convexed surfaces of the frusto-conical casing side walls 15, and the opposed faces of these walls are provided with co-acting antifriction thrust bearings 53—54 at the points 35 on the casing walls.

The inner annular edge of each ring 52 is provided with a lateral flange portion 55 having an inner spherical surface which conforms to that of the hub surface 38 on which it is mounted and an outer spherical surface which rides in the casing section recess 16. The outer peripheral edge of each frusto-conical ring member 52 is likewise provided with a spherical surface in conformity with that of the inner peripheral surface of the casing wall 17. The web or wall portion of each ring 52 is further provided with a pair of vane-like pistons 56 which are rigid therewith and which project laterally from the convex side thereof as shown in Figs. 12 and 13. These piston members 56 are of relatively thin vane or plate formation having curved inner and outer edges which are concentric with the outer surface of hub 35 and the inner surface of casing wall 17 respectively, so as to form a sealing contact therewith regardless of their rotated positions within the casing sections 10—10a.

As is shown in Fig. 8, the slots 50 in the trunnion elements 48 receive the piston vanes 56 with a close fit, whereas the radial slots 47 in the diametrically disposed ribs 45 of the rotor are substantially wider and the side walls thereof are inclined away from the trunnion for reasons later to appear.

From the above description it will be seen that the two central rotors each comprise two relatively movable parts connected by piston vanes and piston guiding members which rotor divides the casing 10—10a into a pair of laterally spaced working or expansion chambers. It will further be seen that while the inner surfaces of the casing side walls 15 are of convex frusto-conical form they are also inclined so that the portions at the bottom of the casing and in a vertical plane including the axis of shaft 26 are spaced from the adjacent side walls 43 of the centrally disposed rotors a distance substantially equal to the thickness of the piston rings 52. The frusto-conical walls 15 of the casing and adjacent portions of the piston carrying rings 52 are vertically disposed in this plane. The working or expansion chambers are therefore laterally confined by the central rotor walls 43 and outer ring walls 52 and accordingly these working chambers are of zero width in the referred to plane and increase in width circumferentially of the casing from either side of said plane to the top of the casing where the chambers are of maximum width in the same plane.

This form of the working and expansion chambers is constant even though successive circumferential points on said confining walls successively pass through said plane upon rotation thereof in unison, which is effected by maintaining connection of the hubs 36 with driven shaft 26, and engagement of the ring piston vanes 56 within the trunnion slots 50 of the central rotor at the upper widest portions of the expansion chambers, as is shown in Figs. 1 and 9.

Preferably, and as shown and described above, each frusto-conical ring 52 carries a pair of diametrically disposed functionally integral piston vanes 56 and those on one ring are arranged at 90° spaced relation to those on the other ring, as will be seen in Figs. 1, 6 and 9. From the showing in Fig. 6 it will be further seen that the piston vanes on one ring member have been caused to move through the trunnion slots 50 in the central rotor as well as substantially through the enlarged slots 47 in the rotor body. Fig. 6 is a horizontal sectional view and the piston vanes are here shown in their mean range of movement.

As the piston vanes reach the bottom of the casing, as shown in Figs. 1 and 9, they will extend through the trunnion slots 50 and through the radial slots 47 in the rib 45 of the rotor body carrying that trunnion as well as substantially through the space S provided in the center of the rotor by the flange 44 of the other rotor part 45.

The piston vanes 56 have a substantial snug fit in the slots 50 as has already been brought out and since the spaced walls 43 of the central rotor member are otherwise imperforate, the independence of the two working or expansion chambers is maintained.

It is to be observed that each piston vane guiding trunnion 48 has a flat side wall 48' between its cylindrical end portions and is otherwise circular in cross section to rock in its bearing. The purpose of the flat wall is to permit uniform rolling engagement of rings 52 with the opposed wall 43 of the central member at the bottom of the casing, see Fig. 9. However, in this figure of the drawings it will be observed that in the intermediate point of rotation also shown in Fig. 6, the trunnions 48 must rotate in their recesses 46 and such flat walls will not then be flush with the outer surfaces of the walls 43, the flat walls being here shown on their maximum angularity.

It will be understood from the foregoing that the spherical surfaced hubs 36 which are keyed together on the driven shaft 26 rotate in the spherical enlargements 14 of the casing side wall hub portions 11 and the inner spherical surfaced flanges 55 of the piston vane carrying rings 52 move laterally over the spherical surfaces of the rotor hubs upon rotation thereof in conformity with the side walls 15 and thrust bearings 54 of the casing sections 10—10a.

Provision is made for admission of a working fluid such as steam, to and exhaustion thereof from the expansion chambers, which in Fig. 6 are designated 60 and 61, and accordingly the casing peripheral walls 17 are provided with ports, Fig. 2, which are disposed at opposite sides and closely adjacent the lines of positive closure between the chamber at the bottom of the casing wherein the piston vane carrying rings 52 contact the walls 43. These lines of contact or chamber closure at the narrow portion thereof are indicated at 62 in Figs. 2 and 5A, and each chamber is provided with a port 63 at each side of contact line 62, such ports extending through the casing section bottom walls and being intake ports or exhaust ports at opposite sides of said line depending upon the direction of rotation of the rotor, as determined by the control valve.

The base 22 is provided with a transverse bore 64 for receiving a rotary valve member and a plurality of ports are formed in this base extending vertically from the bore 64 and communicating with the casing ports 63. The ports in the base are designated 65, 66, 67 and 68, ports 65 and 66 communicating with ports 63 of chamber 60 and ports 67 and 68 communicating with ports 63 of chamber 61. The base 22 is also provided with a working fluid inlet port 69 communicating with an outer connection 70 to a source of supply. The inlet and exhaust of the working fluid is controlled by the rotary valve 71 which comprises a cylindrical body member 72 rotatably mounted in the bore 64 in the base 22 and provided with an annular flange 73 at one end thereof for engagement with the corresponding end of the base.

The valve body 72, at its opposite end, is provided with a tubular extension 74, whose bore 75 extends substantially within the body 72, axially thereof, for communication with an exhaust port in said body. This extension 74 is externally threaded adjacent the base 22, as at 76, and a nut 77 is threadedly engaged on these threads for adjustably urging a friction washer 78 into engagement with that end of the base for retaining the valve against axial movement in the base. The opposite end of the valve body is also provided with an axial extension 79 to which an operating handle 80 is secured for manual rotation of the valve.

Now with reference to Figs. 3, 4, 5 and 5A it will be seen that the valve body 72 is provided near one end with a transversely extending through passageway of Y-form providing three circumferentially spaced ports 82, 83 and 84 in the cylindrical surface of the valve. These ports 82, 83 and 84 are in the vertical plane of ports 67, 68 and 69 in the base 22 as shown in Fig. 1. Here it will also be seen that near the opposite end of this rotary valve 72 the cylindrical body is further provided with diametrically disposed through passageways and ports 85 and 86 which communicate at one end with the centrally disposed exhaust port bore 75 and which are disposed in the vertical plane of ports 65 and 66, in the base 22, for selective registration therewith at their opposite ends.

Extending into the cylindrical surface of the valve 72 between the planes designated by the lines 3—3 and 4—4, in Fig. 5, is a connecting groove of Y-form having its base end 88 terminating in the plane of ports 65, 66, 85 and 86 and its branch ends 89 and 90 terminating in the plane of ports 81, 67 and 68.

When this rotary valve body is in the position of Fig. 5, as observed from above, no working fluid will be admitted to the casing ports 68 since ports 82 and 83 are disposed at opposite sides of the inlet port 69, and closed by the bore of the base 22.

Upon rotation of the valve body through an angle of 45°, as for example clockwise, port 83 will be aligned with inlet port 69 and port 84 will align with port 68, in the base so that the working fluid will be admitted to expansion chamber 61. Accordingly the rotor assembly will turn in the direction of arrow A, in Fig. 5A. At this time the chamber 61 will be exhausting through port 67 into one of the forked ends 89 of the Y-shaped groove 87 in the surface of the rotary valve thence from the base end 88 of the groove into port 66. Thus the working fluid from chamber 61 will finally expend its energy in expansion chamber 60 in driving the pistons 56 therein. The spent working fluid in chamber 60 will finally exhaust through port 65 in the base and thence through port 85 to the exhaust bore 75.

Upon rotation of the valve body in the opposite direction or anti-clockwise, the motor will be reversed in direction of the arrow B, in Fig. 5A, with the above described operation.

While I have shown and described my invention as embodied in an improved type of rotary motor with some degree of particularity, it will be realized that other modifications and changes may be resorted to under special conditions. I, therefore, do not wish to be limited and restricted to the exact details shown and described, but reserve the right to make such changes and modifications as may fairly fall within the scope of the subject matter now being claimed.

Having thus described my invention, what I claim is:

1. In a motor of the class described, including a casing having a driven shaft journalled therein and a rotor disk secured to the shaft and rotatable in a plane normal thereto; the improvements comprising a frusto-conical side wall on said casing facing said rotor disk and a peripheral wall having a spherical inner surface, a hub on said rotor disk extending between same and said casing side wall and having a spherical surface of the same curvature as that of said peripheral surface, a ring having a frusto-conical wall the outer periphery of which is in bearing engagement with the spherical inner surface of said casing, and having its inner periphery in frictional bearing engagement with said hub, and the outer face of the frusto-conical wall of said ring being in thrust bearing engagement with the inner convex surface of said casing side wall, said ring having a pair of diametrically disposed piston vanes extending from the convex side thereof and normal thereto, said rotor disk having a pair of diametrically disposed radially extending slots in which said piston vanes are slidably engaged, said rotor disk and ring being in bearing engagement in a plane including the axis of said shaft, inlet and exhaust ports in the peripheral wall of said casing at opposite sides of said plane and inlet and exhaust conduits in communication with the inlet and exhaust ports respectively.

2. The structure according to claim 1 wherein said rotor disk is provided with a pair of diametrically disposed and radially extending cylindrical seats opening through a side wall thereof, a trunnion rotatably supported in each seat, and said slots being provided in said trunnions and extending diametrically therethrough.

3. In a motor of the class described, including a casing having opposite side walls and a peripheral wall, said side walls including central hub portions in which a driven shaft is journalled, and a rotor rotatably mounted in said casing; the improvements comprising annular frusto-conical portions on said side walls facing each other and whose axes intersect in a point to one side of said shaft, said peripheral wall including a central cylindrical bearing portion and spherical surface portions between same and said frusto-conical side wall portions, said rotor comprising a disk member having its peripheral portion rotatably journalled in said cylindrical bearing portion and having spherical surfaced hubs extending between same and said casing hub wall portions and being secured to said shaft, said rotor disk member having opposite side walls dividing the casing and providing a pair of expansion chambers, a frusto-conical ring in each chamber having its outer concave wall in thrust bearing engagement with the inner face of the corresponding frusto-conical casing side wall, the inner and outer peripheries of the rings being in frictional bearing engagement with the spherical surfaces of said hubs and said peripheral walls respectively, the opposite side walls of said rotor disk member and the inner walls of said rings being in bearing contact in a plane including the axis of said shaft, a pair of diametrically disposed piston vanes rigid with the inner face of each ring and extending normal thereto, a pair of diametrically disposed radially extending guiding slots in each opposite side wall of said disk member in which said piston vanes are slidably disposed, and inlet and exhaust ports in said peripheral wall in communication with each chamber and at opposite sides of said plane.

4. The structure according to claim 3 wherein the diametrically disposed pistons on one ring are arranged in 90° relation to the diametrically disposed pistons on the other ring, said opposite side walls of said rotor disk being in substantially spaced relation axially of said shaft, radially disposed ribs between said side walls and projecting therefrom with the ribs on one side wall disposed intermediate the ribs on the opposite side wall, slots extending through said ribs, and trunnion members supported in said walls for rotation about radial axes and each having piston guiding slots opening into said rib slots, said trunnion slots being substantially of the same width as the thickness of said piston vanes and said slots in said ribs being substantially wider to provide for rotation of the trunnions when the pistons are projected through the slots therein.

5. The structure according to claim 4 wherein said trunnion members have their outer ends disposed adjacent the inner surface of said casing peripheral wall, the inner ends of said trunnions being rotatably disposed in sockets in said hubs, and bearing members disposed between the outer and inner ends of said trunnions and said peripheral wall and the bottoms of said sockets.

6. In a motor including a casing and a rotor rotatably mounted therein; the improvements comprising a frusto-conical side wall on said casing, said rotor including a member having an annular wall and a frusto-conical ring having its concave surface in thrust bearing engagement with said side wall and supported by said member for sidewise movement relative thereto, a piston vane rigidly carried by said ring, a trunnion member supported in said annular wall for rotation about an axis extending radially of said member, and a guide slot in said trunnion member in which said piston vane is slidable upon said relative movement of said member and ring.

7. A rotary motor including a casing and a piston carrying rotor rotatably mounted therein; the improvements comprising a spherical peripheral wall on said casing and opposed outwardly inclined frusto-conical side walls joining said peripheral wall to define therebetween an annular chamber, said piston carrying rotor being centrally mounted in said chamber on a horizontal shaft extending through bearings in said side walls and dividing said chamber into separate working chambers, said rotor having spherical hub portions which are concentric with said peripheral casing wall and extend between opposite sides of said rotor and said casing side walls, a frusto-conical piston vane carrying ring bearing on each spherical hub portion and having thrust bearing engagement with the respective casing side wall, radially slotted trunnions mounted in said rotor and guidably receiving the piston vanes of said rings, and ports communicating with said chambers on opposite sides of said rotor.

References Cited in the file of this patent
UNITED STATES PATENTS

| Number | Name | Date |
|--------|------|------|
| 497,108 | Wilson | May 9, 1893 |
| 1,376,397 | Bylger | May 3, 1921 |
| 1,904,374 | Kempthorne | Apr. 18, 1933 |
| 1,968,175 | Schnurle et al. | July 31, 1934 |
| 2,101,051 | Cuny | Dec. 7, 1937 |
| 2,341,231 | Nordling | Feb. 8, 1944 |